United States Patent [19]
Grubb et al.

[11] 3,786,455
[45] Jan. 15, 1974

[54] MAGNETIC DOMAIN DECODER/ENCODER DEVICE

[75] Inventors: Harold R. Grubb, Owego; Lynn C. Liebschutz, Apalachin, both of N.Y.

[73] Assignee: International Business Machines Corporation, Armonk, N.Y.

[22] Filed: July 3, 1972

[21] Appl. No.: 268,329

[52] U.S. Cl. 340/174 TF, 340/174 AB, 340/174 SR
[51] Int. Cl. .......................... G11c 5/02, G11c 11/14
[58] Field of Search ............................... 340/174 TF

[56] References Cited

UNITED STATES PATENTS 3,701,125 10/1972 Chang et al. .................. 340/174 TF
3,623,034 11/1971 Bonyhard ..................... 340/174 TF

*Primary Examiner*—James W. Moffitt
*Attorney*—John S. Gasper et al.

[57] ABSTRACT

The decoder/encoder comprises plural parallel magnetic domain compressor circuits. All the idler cells of the compressor circuits are initially filled with a magnetic domain. Decode circuit drivers which include current loops associated with selected idler stages are operated to trap domains in accordance with a code pattern. A domain output is obtained from the compressor circuits having no domains trapped in idler cells while the compressor circuits having domains trapped therein do not provide a domain output to a detector circuit.

7 Claims, 15 Drawing Figures

MAGNETIC DOMAIN DECODER/ENCODER DEVICE

BACKGROUND OF THE INVENTION

1. Field of the Invention

This invention relates to decoder/encoders and particularly to decode/encode devices using magnetic domain compressor circuits.

2. Description of the Prior Art

Compressor circuits for single wall magnetic domains are known in the art as exemplified in the following U. S. Pat. Nos. and printed publication: 3,623,304 — Bonyhard et al.; 3,651,496 — Danylchuk et al.; IEEE Transactions on Magnetics, Volume Mag. — No. 3, September 1970, pages 450–451.

The magnetic domain compressor circuit is basically a chain of interconnecting domain recirculating or idler cells. Domains located in the magnetic sheet material at the idler cell positions are recirculated by an in-plane rotating field. Propagation of domains along the chain is obtained by injecting domains into the input of the compressor circuit in timed relation with the rotation of the in-plane field. When all idler cells are filled with a domain, the injection of an additional domain at the input end causes a corresponding domain to be expelled during the same in-plane field cycle from the last of the series of idler cells to an output circuit where sensing or other functions may be performed. If any idler cell lacks a domain, injection of a domain at the appropriate field rotation time causes a domain from an adjacent idler cell or the injected domain to fill the empty idler cell, but no output from the terminus of the compressor circuit is realized. This characteristic of the compressor circuit has been relied upon in the prior art for adapting the compressor to provide a logic function. For example, in the above-referenced Danylchuk et al patent, compressor circuit is used in combination with data propagation channels to provide an AND logic function.

BRIEF DESCRIPTION OF THE INVENTION

It is an object of the present invention to provide a decode device which utilizes the high speed domain propagation properties of magnetic domain compressor circuits.

It is a further object to provide a compressor decode device which can be used with magnetic domain storage apparatus.

The present invention uses a plurality of magnetic domain compressor circuits in an arrangement which provides a decode logic function. Specifically, this invention comprises a plurality of parallel compressor circuits in which all idler cells are initially filled with a magnetic domain. Thereafter, the domain content of predetermined combinations of idler cells is controlled so that only a single compressor circuit is entirely operational to pass magnetic domains to a detector output circuit. In the preferred embodiment of this invention the control of the idler cells is effected by current loops to generate a localized magnetic field to hold domains in their respective idler cells. Thus, when the in-plane rotation field is operating and the control field from the current loop is effective, the normal circulation of the domain in one or more of the idler cells is inhibited. Consequently, the injection of domains into the input of an inhibited compressor circuit will not be effective to cause domains to flow from the output end of the compressor circuit. Domain detector connected to the outputs of the compressor circuit sense overflow domains. Since only a single compressor is completely operational, all detectors are connected to a common output sense circuit. Thus, a high speed decode device with minimal sense circuitry is provided. A simplified decode/encode arrangement is also realized. The decoder device has special application for magnetic domain storage systems which have multiple shift registers, each of which can be conveniently connected to the inputs of the compressor circuit.

The foregoing and other objects, features and advantages of the invention will be apparent from the following more particular description of a preferred embodiment of the invention, as illustrated in the accompanying drawing.

DESCRIPTION OF A PREFERRED EMBODIMENT

Figure 1:
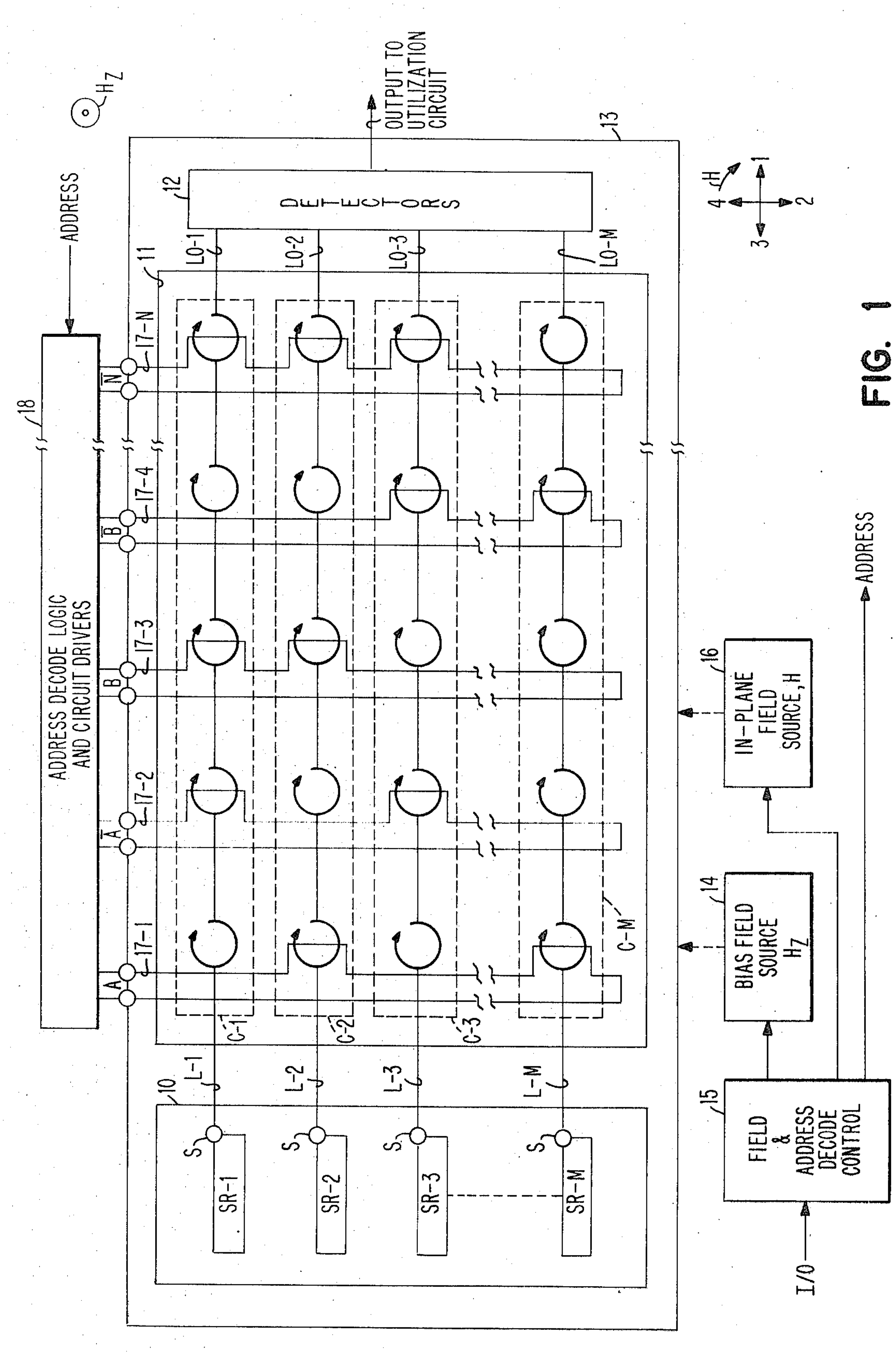
FIG. 1 is a schematic diagram of a magnetic domain memory system using the decoder/encoder of the present invention.

As seen in the schematic diagram of FIG. 1, a memory system using cylindrical magnetic domain comprises a data storage section 10, a decode section 11 and a detector section 12 formed as an integrated package on a magnetic sheet 13. As is well known in the art, the magnetic sheet 13 is preferably a garnet or orthoferrite and has a bias magnetic field $H_z$ normal to its plane for maintaining the cylindrical magnetic domains. A magnetic bias field of conventional type is provided from a bias field source 14 which can be an external coil. The storage section 10 comprises a plurality of closed loop shift registers SR-1 — SR-M in which cylindrical magnetic domains move in closed paths through the magnetic sheet 13. A domain splitter S at the juncture of the return path for each shift register SR has an output connection on lines L-1 — L-M to the decode section 11. In a specific case, the closed loops of the shift registers SR-1 — SR-M are provided by permalloy patterns which function as the propagation means with an in-plane rotating magnetic field H. Other propagation means can be used such as conductor loops; however, in the preferred embodiment in which this invention was used the in-plane rotating field and permalloy patterns are used. A control section 15, which includes field control circuitry, controls the operation of the bias fields 14 and the in-plane propagation field source 16.

Each shift register SR-1 — SR-M is connected to a write source (not shown) for writing new data into each shift register at selected intervals. Such a write source is well-known in the art and is not described to simplify the description. Reference can be made for further details of such a structure to patent application of Hsu Chang et al., U.S. Pat. Ser. No. 158,232, filed June 30, 1971, now U.S. Pat. No. 3,689,902.

The decode section 11 of this invention comprises a plurality of compressor circuits C-1 — C-M and in the particular embodiment of the present invention the decode section functions as a read decode for the data storage section 10. However, the decoder section could also function as a write decoder for data being supplied to the shift registers SR-1 — SR-M. The decoder section has conductor loops 17-1 through 17-N which are connected to address decode logic and circuit drivers 18. Selection of the current loops 17-1 — 17-N is made in a conventional manner through an Address signal from the control section 15 upon instructions from an external device such as an I/O input of a data processing system. Depending upon which current loops 17-1 — 17-N are energized, as will be more fully discussed hereinafter, any of the shift registers SR-1 — SR-M in the data storage section 10 will be selected for transmitting data through the selected compressor circuits C-1 — C-M for communication to the detector section 12 to an output utilization circuit not shown. The detector section 12 includes individual magnetic domain detector means associated with the outputs, L0-1 — L0-M from the compressor circuits C-1 — C-M, each sensor preferably being connected to a common output line to the utilization circuit.

Figure 2:
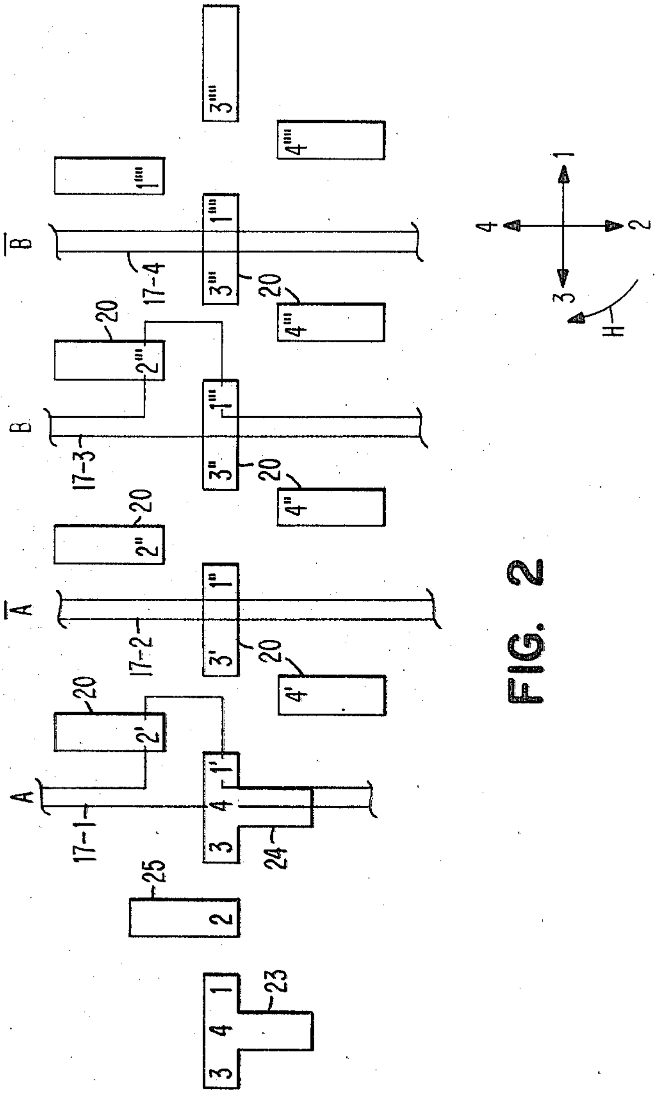
FIG. 2 shows details of a portion of a compressor circuit of the decoder of FIG. 1.

As previously mentioned, the compressor circuits C-1 — C-M are preferably formed using magnetic overlays on sheet material 13. The idler cells of the compressor circuits are formed from magnetic bars 20, as is well-known, preferably as arranged in FIG. 2. The input on lines L-1 — L-M from the shift registers might include overlay propagation arrangements of T-bars 23 and 24 with I-bar 25. As shown in FIG. 2, T-bar 24 is, at position 1′, part of the idler cell for channel A of the compressor circuit. Decode conductors 17-1, 17-2, 17-3 and 17-4 are for decode positions A, $\bar{A}$, B, and $\bar{B}$, respectively. In the channel position A, conductor 17-1 has a loop portion which overlays positions 1′ and 2′ of its idler cell. Conductor 17-3 in channel D likewise has a loop portion overlying domain positions 1‴ and 2‴. The conductors 17-1 — 17-N have similar loop positions for various other idler cells of the compressor circuits C-1 through C-M, as illustrated in FIG. 1. When energized by the decode logic and circuit drivers 18, under address control of control section 15, the loop portions of the conductors generate a magnetic field in the vicinity of the magnetic overlays, as indicated, to hold magnetic domains in a fixed position within the idler cells. Thus, as the magnetic field H rotates, the domain of an idler cell, which is held by the energized conductor 17 will not circulate through the remaining positions of the cell. In those compressor circuits which do not have any energized decode conductors the domains will circulate in the idler cells in synchronism with the rotation of in-plane magnetic field H, and, if a domain is generated from the shift register, an output domain will be produced at detector section 12.

Figure 3A:
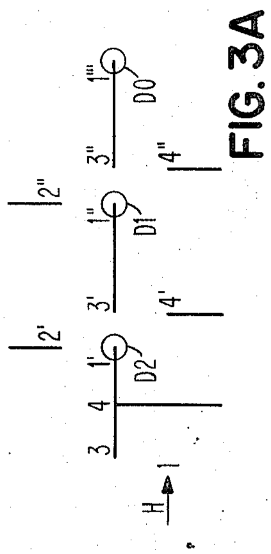
FIGS. 3A – 3L is a sequence of drawings illustrating the operation of a portion of the decoder of FIG. 1.
Figure 3B:
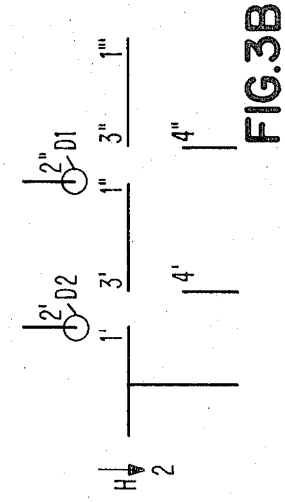
Figure 3C:
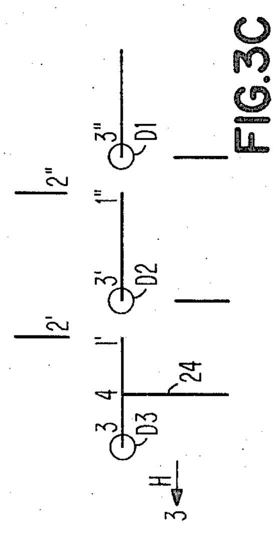
Figure 3D:
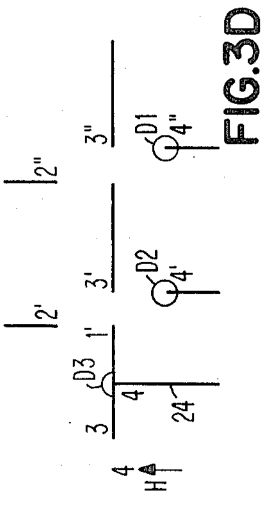
Figure 3E:
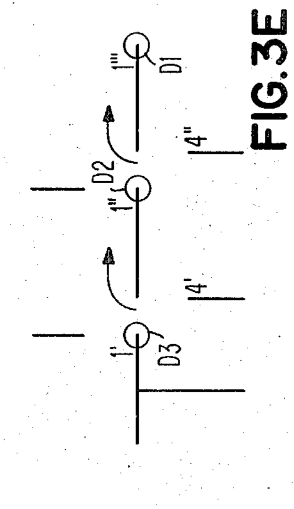
Figure 3F:
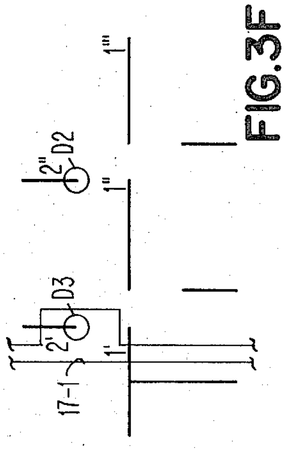
Figure 3G:
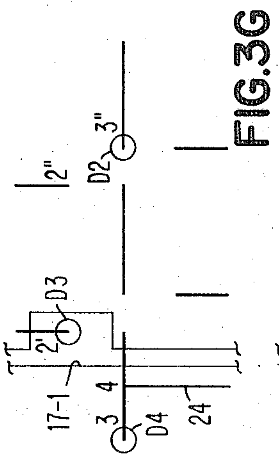

This is further illustrated in the sequence drawings, FIGS. 3A - 3L. It is to be noted in this sequence of drawings that the conductors 17-1 — 17-N have been omitted when an energizing current is not present. When a selection current is applied to a conductor 17 and its associated loop portion, for blocking domain recirculation, the conductor is shown in the drawings. Referring to FIG. 3A, when the in-plane rotating field is in phase position 1, the domains D0, D1 and D2 are present in their respective idler cells of the compressor circuit at positions 1‴, 1″ and 4′, respectively. At in-plane field phase 2, as shown in FIG. 3B, domains D1 will have moved to position 2″ and domain D2 will have moved to position 2′. Domain D0 will have moved from position 1‴ to a position 2‴, (not shown) in this figure. At in-plane rotation field phase 3, FIG. 3C shows the domains D1 and D2 now in cell positions 3″ and 3′, respectively, and new domain D3 from a shift register has moved into position 3 of T bar 24. As the in-plane field H rotates to phase 4, the domains D1 and D2 will move to positions 4″ and 4′, respectively, while domain D3 moves into position 4. As seen in FIG. 3E, where in-plane field has completed one rotation cycle and has returned to position phase 1, it being assumed that no conductor loops inhibit an idler cell, domain D3 will have moved to position 1′ from position 4 of T-bar 24 into the first idler cell; domain D2 likewise will have advanced to position to 1″ from position 1′; and domain D1 will have moved to position 1‴ from position 4″. Thus, as is well-known in the art, domain D0 will also advance to the next succeeding idler cell and so on through the cells until the domain in the last cell moves into an output line L0 where it is detected by suitable means in detector section 12. In accordance with this invention the advance of domains from successive idler cells is prevented by means of holding at least one domain fixed in all compressor circuits except one. This is done by energizing selected conductors 17-1 — 17-N. Thus, as shown in FIG. 3F, the conductor 17-1 of channel A has been energized. This occurs when in-plane rotating field H is at phase 2 and domain D3 has moved from cell position 1′ to 2′. In the adjacent cell domain D2 will again at this phase 2 have moved from position 1″ to position 2″. Similarly, D1 will have moved out of position 1‴ to its second position (not shown). In FIG. 3G a new domain D4 is being introduced to the input of the compressor circuit at position 3 of T-bar 24. Since conductor 17-1 is energized, domain D3 will be held by magnetic field action of the loop portion of conductor 17-1 in the idler cell position 2′. In the adjacent cell of the compressor circuit, however the corresponding conductor 17 is not energized and domain D2 is free to move from position 2″ to 3″. Similarly, the domains in all succeeding idler cells of the compressor circuit that do not have energized loop portions of conductors 17 will move to their third position in phase with the rotation of the in-plane field H at phase 3. It is understood that if more than one idler cell of a compressor circuit C-1 — C-M is energized, domains are inhibited at their cells, although only one cell need be inhibited to block the compressor.

Figure 3H:
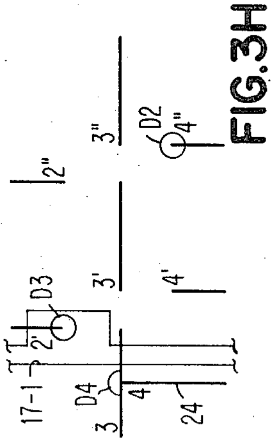
Figure 3I:
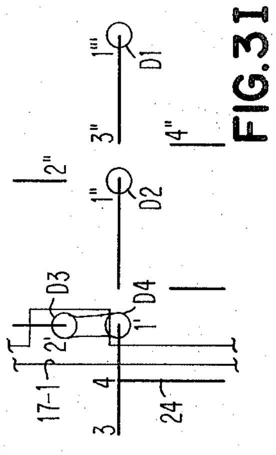

As shown in FIG. 3H, the in-plane field at phase position 4 will cause the new domain D4 to move from position 3 to position 4 of T-bar 24. Domain D3 due to the holding action of current in the conductor 17-1 continues to be held at cell position 2′. In the adjacent cell, however, domain D2 will move from cell position 3″ to cell position 4″. As in-plane field rotates to phase position 1, as shown in FIG. 3I, domain D4 moved from position 4 of T-bar 24 to position 1′ in the idler cell. At this time conductor 17-1 is still energized. Consequently, domain D3 is still held in idler cell position 2′. Also, due to the localized field effect of current in loop portion of conductor 17-1, domain D4 is merged into domain D3 at position 2′, although the drawing shows the domains separated. In the adjacent cell domain D2 will have moved from position 4″ to cell position 1″.

Similarly, domain D1 will have returned from its phase 4 position to the phase 1''' position, as shown in FIG 3I. Thus, it will be seen that during two complete rotations of the in-plane magnetic field H, the introduction of domain D4 from an outside source such as shift register SR-1 produces no propagation of domains in the idler cells of the compressor circuit. Domains D0, D1 and all other domains in cells which are not subject to a holding field from its corresponding conductor 17, will merely recirculate as the in-plane's field H rotates. In the idler cell which has a decode conductor 17 energized the domain such as domain D3 will be held in a fixed position throughout the period of energization. Thus, any domains such as D4 introduced from the external source do not displace the domain that is being held and consequently no domain outpu will be experienced from the compressor circuit which has domain blocking in effect.

Figure 3J:
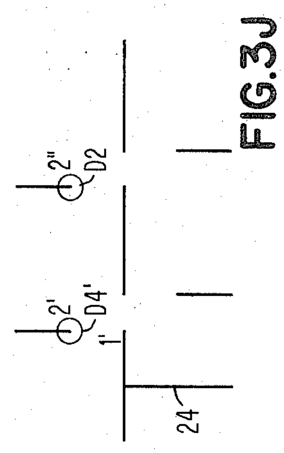
Figure 3K:
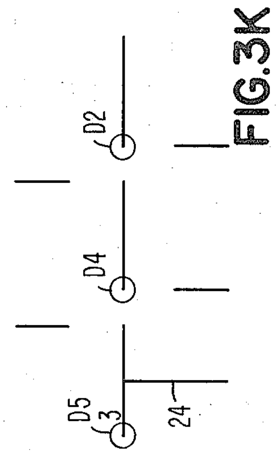
Figure 3L:
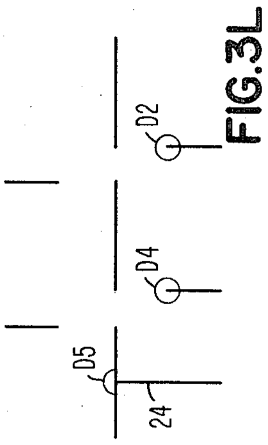

FIGS. 3J, 3k and 3l illustrate the continuation of the propagation of domains into the input of the compressor circuit when no current is supplied to a decode conductor 17. Consequently, the domains will move through the various idler positions and will advance upon introduction of domain D5 into position 3 of T-bar 24. In this sequence the merged domain is represented as D4' as a further domain D5 enters the compressor input at phase 3.

Figure 4:
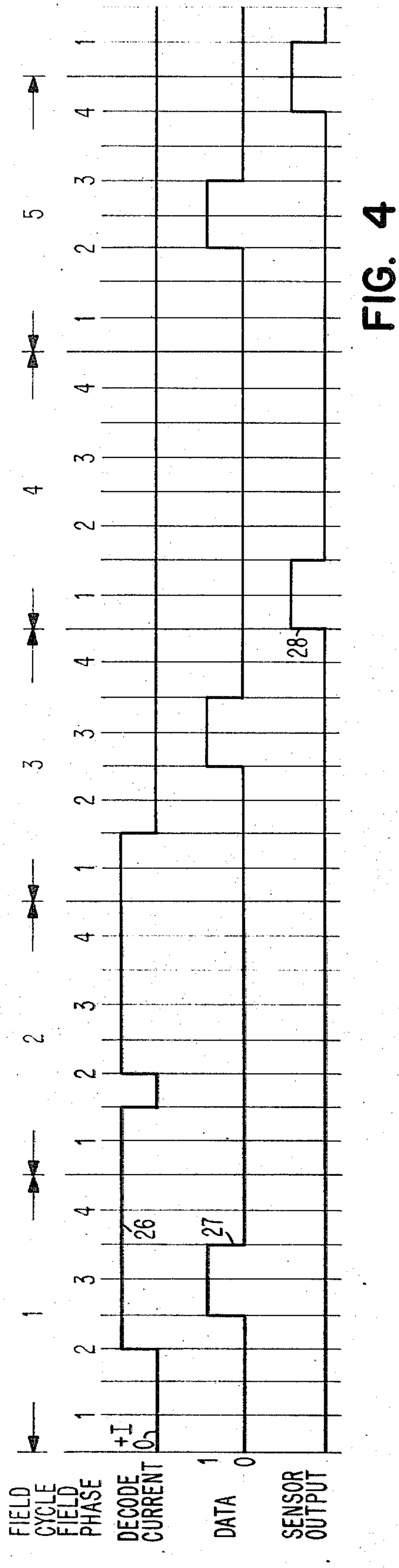
FIG. 4 is a timing chart associated with the sequence drawings of FIG. 3 further illustrating the operation of the decode mechanism of FIG. 1.

To perform a decode function using the plurality of compressor circuits C-1 — C-M various conductors 17-1 — 17-N are selectively energized from the decode and driver circuits 18, as previously described. Thus, selection of a compressor circuit for gating an output of a shift register from the storage section 10 is provided by energizing various conductors 17-1 — 17-N so as to block the transmission of data from non-selected registers to the compressor circuits on to the detector circuits. In this embodiment of the invention the shift registers are producing domain outputs on lines L-1 — L-M in every case. The decode section will not pass the data from any register unless no blocking sites are generated with the conductors 17-1 — 17-N. In order to block any particular shift register a decode current, as shown in FIG. 4, is turned on at phase 2 of the field cycle of in-plane field H. For all nonselected shift registers their corresponding compressor circuits must be blocked each field cycle which corresponds with the data transmission through the selected shift register and compressor circuit channel. As seen in FIG. 4, this is illustrated by decode current curve 26, which is turned on at field cycle phase 2 and held on through phase 1 of the subsequent cycle. (Energization is illustrated with an up level current of +I typically on the order of 20ma.) During this time data from the shift registers will be propagated to all of the compressor circuits during phase 3 of the field cycle, as shown by curve 27. As previously discussed, in all compressor circuits having a decode current switched on during phases 2, 3, 4 and 1 of the field cycles the data represented by curve 27, for example, will be blocked from transmission to the detectors and sensor circuits of FIG. 1. Where no decode current is applied to a specific compressor circuit the data will be sent in the appropriate detector on the corresponding output line L0-1 to L0-M at field cycle time 1. It is this phase of the in-plane field rotation cycle that the domain appears at the output line of the compressor circuits. The timing of the detector and sensor section is shown by curve 28 in FIG. 4.

Various decode arrangements can be provided with the decode compressor circuit arrangement shown in FIG. 1. However, in the specific configuration the transmission of data from a specific shift register of storage section 10 through its compressor circuit in decode section 11 to detectors in section 12 is obtained by blocking all compressor circuits except the one which has been selected. Specifically, if shift register SR-3 has been selected to supply data to an output or utilization circuit, conductors 17-1, 17-3 would be energized while conductors 17-2, 17-4 and 17-N and any other conductor having a loop portion to an idler cell of compressor C-3 would not be energized. Energizing conductor 17-1 would block compressors C-2 and C-M at idler position 1. Energization of conductor 17-3 would block compressors C-1 and C-2 at their corresponding idler position 3.

As described in the preferred embodiment, the channel selection is obtained by using current-induced magnetic fields to block the recirculation of domains in predetermined idler cells. Other means may be utilized in accordance with this invention to accomplish the same result. Specifically, domain annihilators may be used to remove domains from specific idler cells. Thus, when an input domain is supplied from one of the shift registers, an output domain would not be detected in section 12 since an idler cell would be emptied and therefore available to receive any domain being supplied to the compressor circuit. It would also be within the scope of this invention to block the propagation of domains through the non-selected compressor circuits by removing domains from idler cells into a bypass circuit to be restored to the corresponding idler cell at some predetermined period in the cycle of the in-plane rotating field. Thus, the decode current supplied to the conductor loops 17-1 through 17-N could be used to perform the annihilate or displace function as distinct from the holding function.

Thus, it will be seen that a new use for compressor circuits for decoding data from a memory storage section has been provided. Such an arrangement will permit high speed access to memory storage locations. With this arrangement the number of decode positions is greatly reduced. Timing and synchronizing of flow of data from memory section to utilization circuits is greatly simplified.

While the invention has been particularly shown and described with reference to a preferred embodiment thereof, it will be understood by those skilled in the art that various changes in form and details may be made therein without departing from the spirit and scope of the invention.

We claim:

1. A decoder/encoder device comprising in combination a plurality of parallel magnetic domain compressor circuits, said compressor circuits having a chain of idler cells for storing domains therein, means operable for generating domains into said compressor circuits so that domains occupy simultaneously all of said idler cells of said circuits, means operable for selectively holding domains in selected idler cells of selected compressor circuits in accordance with a desired code pattern whereby the flow of domains is selectively blocked through said compressor circuits, and means operable after said domain blocking means for detecting the domain flow of a selected compressor circuit.

2. A decoder/encoder device in accordance with claim 1 in which said domain holding means comprises means for inhibiting the recirculation of domains in selected idler cells of said compressor circuits.

3. A decoder/encoder device in accordance with claim 2 in which said domain recirculating inhibiting means comprises circuit means operable for generating magnetic fields at selected idler cell positions of said compressor circuits.

4. A decoder/encoder device in accordance with claim 3 in which said idler cells of said compressor circuits are arranged in a matrix of parallel horizontal rows and vertical columns, and said domain inhibiting circuit means includes conductor means arranged along said vertical columns of idler cells of various compressor circuits, said conductor means having loop portions for magnetically holding domains of selected idler cells in said vertical columns of said compressor circuits.

5. A decoder/encoder device in accordance with claim 3 in which said domain generators are connected to the inputs of said compressor circuits and said detecting means comprises domain detectors operably connected to the output from said compressor circuits.

6. A decoder/encoder device in accordance with claim 4 in which said generators are associated with a domain shift register.

7. A decoder/encoder device in accordance with claim 3 in which circuit means for generating said magnetic fields is capable of merging domains supplied by said generating means with domains occupying a hold position in a selected idler cell.

* * * * *